(12) United States Patent
Mutter et al.

(10) Patent No.: US 11,996,955 B2
(45) Date of Patent: May 28, 2024

(54) INTERFACE MODULE FOR A COMMUNICATION CONTROL DEVICE, TRANSMITTING/RECEIVING DEVICE FOR A SUBSCRIBER STATION OF A SERIAL BUS SYSTEM, AND METHOD FOR COMMUNICATION IN A SERIAL BUS SYSTEM

(71) Applicant: Robert Bosch GmbH, Stuttgart (DE)

(72) Inventors: Arthur Mutter, Neuhausen (DE); Florian Hartwich, Reutlingen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 0 days.

(21) Appl. No.: 17/910,390

(22) PCT Filed: Apr. 9, 2021

(86) PCT No.: PCT/EP2021/059265
§ 371 (c)(1),
(2) Date: Sep. 9, 2022

(87) PCT Pub. No.: WO2021/219341
PCT Pub. Date: Nov. 4, 2021

(65) Prior Publication Data
US 2023/0224188 A1 Jul. 13, 2023

(30) Foreign Application Priority Data
Apr. 27, 2020 (DE) ...................... 10 2020 205 275.1

(51) Int. Cl.
*H04B 3/00* (2006.01)
*H04L 12/40* (2006.01)
(52) U.S. Cl.
CPC .............................. *H04L 12/4013* (2013.01); *H04L 2012/40215* (2013.01)

(58) Field of Classification Search
CPC ....... H04L 12/4013; H04L 2012/40215; H04L 12/40032; H04L 12/40006
(Continued)

(56) References Cited

U.S. PATENT DOCUMENTS 10,057,081 B2 * 8/2018 Kraly .................. H04L 12/4013
11,245,549 B2 * 2/2022 Haenger ........... H04L 12/40169
(Continued)

FOREIGN PATENT DOCUMENTS

| CN | 108614474 A | 10/2018 |
|---|---|---|
| CN | 110838960 A | 2/2020 |

(Continued)

OTHER PUBLICATIONS

International Search Report for PCT/EP2021/059265, dated Jul. 14, 2021.
(Continued)

*Primary Examiner* — Helene E Tayong
(74) *Attorney, Agent, or Firm* — NORTON ROSE FULBRIGHT US LLP; Gerard A. Messina (57) ABSTRACT

An interface module for a communication control device of a subscriber station. The interface module has at least one configuration register for configuring the bit time of a first communication phase of a frame and/or the bit time of a second communication phase of the frame by means of which frame messages are exchanged between subscriber stations of the bus system, and a modulator for modulating a transmission signal to form a modulated transmission signal which has the bit time of the second communication phase, which bit time is configured in the at least one configuration register and differs from the bit time of the first communication phase. The interface module is configured to output the transmission signal input into the modulator to a transmitting/receiving device of the subscriber station.

15 Claims, 6 Drawing Sheets

(58) Field of Classification Search
USPC .......................................................... 375/257
See application file for complete search history.

(56) References Cited

U.S. PATENT DOCUMENTS

| | | | |
|---|---|---|---|
| 2015/0095532 A1* | 4/2015 | Muth | ........................ G06F 3/00 |
| | | | 710/105 |
| 2018/0139072 A1* | 5/2018 | Komano | .................. H04L 12/40 |
| 2019/0116045 A1 | 4/2019 | Markham et al. | |

FOREIGN PATENT DOCUMENTS

| | | |
|---|---|---|
| DE | 102011007766 A1 | 10/2012 |
| EP | 2521319 A1 | 11/2012 |
| JP | 2016536862 A | 11/2016 |

OTHER PUBLICATIONS

ISO 11898-1:2015 Standard, "Road Vehicles—Controller Area Network (CAN)—Part 1: Data Link Layer and Physical Signalling," 2015, pp. 1-74.

* cited by examiner

INTERFACE MODULE FOR A COMMUNICATION CONTROL DEVICE, TRANSMITTING/RECEIVING DEVICE FOR A SUBSCRIBER STATION OF A SERIAL BUS SYSTEM, AND METHOD FOR COMMUNICATION IN A SERIAL BUS SYSTEM

FIELD

The present invention relates to an interface module for a communication control device, a transmitting/receiving device for a subscriber station of a serial bus system, and a method for communication in a serial bus system that operates at a high data rate with a high degree of fault tolerance.

BACKGROUND INFORMATION

A bus system is frequently used for communication between sensors and control devices, for example in vehicles, in which data are transferred as messages in the standard ISO 11898-1:2015 as a Controller Area Network (CAN) protocol specification with Controller Area Network Flexible Data-Rate (CAN FD). The messages are transferred between the bus subscribers of the bus system, such as the sensor, control device, encoder, etc.

In order to be able to transfer data at a higher bit rate than with CAN, there is an option in the CAN_FD message format to switch to a higher bit rate within a message. The maximum possible data rate is increased by using a higher clock frequency in the range of the data fields above a value of 1 Mbit/s. Such messages are also hereinafter referred to as CAN_FD frames or CAN_FD messages. For CAN_FD, the payload length is extended from 8 to up to 64 bytes, and the data transfer rates are significantly higher than for CAN.

In order to transfer data faster from the transmitting bus subscriber to the receiving bus subscriber than with CAN_FD, a CAN_FD successor bus system is currently in development. In addition to a higher data rate in the data phase than with CAN FD, the payload length of up to 64 bytes, previously achieved with CAN_FD, is also to be increased. However, the advantages of the robustness of a CAN or CAN_FD-based communication network are also to be retained in the CAN_FD successor bus system.

It is possible to increase the higher data rate in the data phase even further by additionally switching the physical layer corresponding to the bit transfer layer or Layer 1 of the conventional OSI model (Open Systems Interconnection Model). In this case, however, the operating mode of the transmitting/receiving device is to be switched, which drives the signals onto the bus and receives them from the bus. For a robust data transfer, the switching of the operating mode of the transmitting/receiving device between the individual transmitting and receiving operating modes must function as smoothly as possible. Only in this way can additional transfers based on transfer faults due to incorrect switching of the operating mode of the transmitting/receiving device be avoided.

The faster the data are transferred on the bus, the higher the requirements placed on the quality of the signal received from the bus by the protocol controller of the subscriber station. For example, if the edge slope of the bits of the received signal is too low and the specification in the protocol controller is not accurate enough, the received signal cannot be correctly decoded.

If the edge slope of the bits of the received signal is increased, there is higher radiation. The more accurate the specification must be in the protocol controller, the higher the cost for the protocol controller and the more complicated the decoding of the received signal.

SUMMARY

Therefore, an object of the present invention is to provide an interface module for a communication control device, a transmitting/receiving device for a subscriber station of a serial bus system, as well as a method for communication in a serial bus system that solve the aforementioned difficulties. In particular, an interface module for a communication control device, a transmitting/receiving device for a subscriber station of a serial bus system, as well as a method for communication in a serial bus system, in which a high data rate and an increased amount of payload per frame can be realized with a high degree of fault tolerance.

The object may be achieved by an interface module for a communication control device for a subscriber station of a serial bus system having the features according to the present invention. According to an example embodiment of the present invention, the interface module has at least one configuration register for configuring the bit time of a first communication phase of a frame and/or that of a second communication phase of the frame by means of which messages are exchanged between subscriber stations of the bus system, and a modulator for modulating a transmission signal to form a modulated transmission signal having the bit time of the second communication phase configured in the at least one configuration register, which differs from the bit time of the first communication phase, wherein the interface module is designed to output, in the first communication phase, the transmission signal input into the modulator to a transmitting/receiving device of the subscriber station in order to transmit the transmission signal onto a bus of the bus system, and wherein the interface module is designed to output, in the second communication phase, the modulated transmission signal produced by the modulator to the transmitting/receiving device of the subscriber station in order to transmit the modulated transmission signal onto a bus of the bus system.

According to an example embodiment of the present invention, the interface module is able to signal the switching of the operating mode of the transmitting/receiving device for the various communication phases very securely and robustly. The interface module is designed such that the two bit times, which can also be referred to as bit durations or bit lengths, are independently configurable based on the communication phase. The interface module allows for the required fast data transfer for the CAN_FD successor bus system without additional, expensive ports between the communication control device and the transmitting/receiving device.

Optionally, the interface module is additionally designed such that the symmetry of the bits is retained in a reception signal RxD, which the transmitting/receiving device has produced from a signal received from the bus and has transmitted to the communication control device. This is true when transmitting as well as when receiving CAN frames. At most, an asymmetry of bits in the reception signal RxD is only very marginally increased. Here, in order to retain the symmetry of the signal, the interface module uses a less complex method than a line coding method, for example PWM coding or Manchester coding. This reduces the complexity of the data transfer and the decoding of the reception signal RxD.

In addition, even in the differential transfer of the reception signal RxD between the transmitting/receiving device (transceiver) and the communication control device (micro-controller), an NRZ coding (NRZ=non-return-to-zero) can be retained. As a result, for data transfer between the transmitting/receiving device (transceiver) and the communication control device (micro-controller), ports (pins) having slow edges can now be used. The resulting lower edge slope of the bits of the received signal, in particular the reception signal RxD, substantially reduces the radiation of the system.

Thus, with the interface module, an edge slope of the bits of the received signal, in particular the reception signal RxD, can be selected such that the requirements for radiation can be easily met. In addition, the communication control device need not use complex line coding methods, such as PWM coding or Manchester coding, in order to retain the symmetry of the signal. This reduces the complexity of the data transfer and the decoding of the reception signal RxD.

In addition, with the interface module between the communication control device and the transmitting/receiving device, an arbitration from CAN can be retained in one of the communication phases, and the transfer rate can still be significantly increased compared to CAN or CAN_FD. This can be achieved by using two communication phases with different bit rates and by safely identifying for the transmitting/receiving device the start of the second communication phase in which the payload is transferred at a higher bit rate than in the arbitration. Therefore, the transmitting/receiving device can safely switch from a first communication phase into the second communication phase.

As a result, a significant increase in the bit rate and thus the transfer speed from transmitter to receiver can be realized. However, a large fault tolerance is also ensured in this case. This helps to realize a net data rate of at least 10 Mbps. In addition, the size of the payload can be greater than 64 bytes, in particular up to 4096 bytes per frame, or can have an arbitrary length, as needed.

The method carried out by the communication control device can also be used when the bus system also has at least one CAN subscriber station and/or at least one CAN_FD subscriber station that transmit messages according to the CAN protocol and/or CAN FD protocol.

Advantageous further embodiments of the communication control device are disclosed herein.

According to an example embodiment of the present invention, the interface module can also have a first multiplexer for receiving a control signal from the communication control device and for receiving the transmission signal and the modulated transmission signal as well as for outputting the transmission signal or the modulated transmission signal as a function of the control signal to the transmitting/receiving device.

It is possible that the interface module also has a clock divider block for producing a clock signal based on a clock signal, by means of which the communication control device produces the transmission signal, and a parameter configured in the at least one configuration register, wherein the modulator is designed to produce the modulated transmission signal based on the clock signal produced by the clock divider block.

The modulator of the transmission signal can be designed for pulse-width modulation (PWM), wherein the at least one configuration register has at least two parameters for determining the length of two phases of a PWM symbol. Additionally or alternatively, the at least one configuration register can have a modulation offset as a parameter for the pulse-width modulation of the modulator.

According to one exemplary embodiment of the present invention, the interface module also has a decoding block for receiving a digital reception signal produced by the transmitting/receiving device from a signal received from the bus and a reception signal inverse to the digital reception signal and for decoding the resulting differential signal to form a non-differential reception signal, and a second multiplexer for outputting the non-differential signal produced by the decoding block to the communication control device when the transmitting/receiving device is switched to an operating mode of the second communication phase. Here, it is possible that the interface module is designed such that the first and second multiplexers are controlled by the same control signal.

The interface module described above can be part of a communication control device for a subscriber station of a serial bus system, wherein the communication control device also has a communication control module for producing a transmission signal for controlling a communication of the subscriber station with at least one other subscriber station of the bus system, in which bus system at least one first communication phase and a second communication phase are used for exchanging messages between subscriber stations of the bus system, wherein the communication control module is also designed to produce a control signal and output it to the interface module, said control signal indicating when the modulated transmission signal produced by the modulator is to be output to the transmitting/receiving device of the subscriber station. Here, the operating mode signaling signal can signal to the interface module into which operating mode the transmitting/receiving device is to be switched as a function of the communication on the bus.

The communication control device can also have a first port for transmitting the transmission signal to the transmitting/receiving device, a second port for receiving a digital reception signal from the transmitting/receiving device, and a third port for receiving a digital reception signal inverse to the digital reception signal from the transmitting/receiving device at an STB port, which is provided for signaling a standby state to the transmitting/receiving device, in which state no communication occurs on the bus.

Optionally, according to an example embodiment of the present invention, the communication control module is designed to produce the transmission signal in the first communication phase with bits having a first bit time that is greater by at least a factor of 10 than a second bit time of bits produced by the communication control module in the second communication phase in the transmission signal.

The aforementioned object may also be achieved by a transmitting/receiving device for a subscriber station of a serial bus system having the features according to the present invention. According to an example embodiment of the present invention, the transmitting/receiving device has a transmitting/receiving module for transmitting a transmission signal onto a bus of the bus system, in which bus system at least a first communication phase and a second communication phase are used in order to exchange messages between subscriber stations of the bus system, and for producing a digital reception signal from a signal received from the bus, a first port for receiving a transmission signal from a communication control device, a second port for transmitting the digital reception signal to the communication control device, a coding block for producing a reception signal inverse to the digital reception signal, and a third port for transmitting the inverse reception signal to the communication control device.

The transmitting/receiving device offers the same advantages as mentioned above in relation to the interface module and/or the communication control device. Advantageous further developments of the transmitting/receiving device of the present invention are disclosed herein.

Optionally, the transmitting/receiving module is designed to transmit the transmission signal as a differential signal onto the bus, wherein the third port is an input-to-output switchable STB port, which is provided for signaling a standby state to the transmitting/receiving device, in which state no communication occurs on the bus.

According to one option of the present invention, the signal received in the first communication phase from the bus is produced with a different physical layer than the signal received in the second communication phase from the bus.

It is possible that, in the first communication phase, it is negotiated which of the subscriber stations of the bus system receives an at least temporarily exclusive, collision-free access to the bus in the subsequent second communication phase.

The above-described communication control device and the above-described transmitting/receiving device can be part of a subscriber station of a bus system, which also has a bus and at least two subscriber stations, which are connected to one another via the bus in such a way that they can communicate serially with one another. Here, at least one of the at least two subscriber stations has an above-described communication control device and an above-described transmitting/receiving device.

The aforementioned object may also be achieved by a method for communication in a serial bus system according to the present invention. According to an example embodiment of the present invention, the method is carried out with a subscriber station for a bus system, in which at least one first communication phase and a second communication phase are used in order to exchange messages between subscriber stations of the bus system, wherein the subscriber station uses an above-described interface module, and wherein the method has the following steps: modulating, with a modulator, a transmission signal to form a modulated transmission signal with a bit time of the second communication phase configured in the at least one configuration register that is different than the bit time of the first communication phase; outputting, with the interface module in the first communication phase, the transmission signal input into the modulator to a transmitting/receiving device of the subscriber station in order to transmit the transmission signal onto a bus of the bus system; and outputting, with the interface module in the second communication phase, the modulated transmission signal produced by the modulator to the transmitting/receiving device of the subscriber station in order to transmit the modulated transmission signal onto a bus of the bus system.

The method offers the same advantages as those mentioned above in relation to the interface module and/or the communication control device and/or the transmitting/receiving device.

Further possible implementations of the present invention also include combinations of features or embodiments that are not explicitly mentioned above or below with respect to the exemplary embodiments. Here, the person skilled in the art will also add individual aspects as improvements or supplements to the respective basic form of the present invention.

BRIEF DESCRIPTION OF THE DRAWINGS

In the following, the present invention is described in further detail with reference to the figures and on the basis of exemplary embodiments.

In the figures, the same or functionally similar elements are given the same reference numerals, unless otherwise specified.

DETAILED DESCRIPTION OF EXAMPLE EMBODIMENTS

Figure 1:
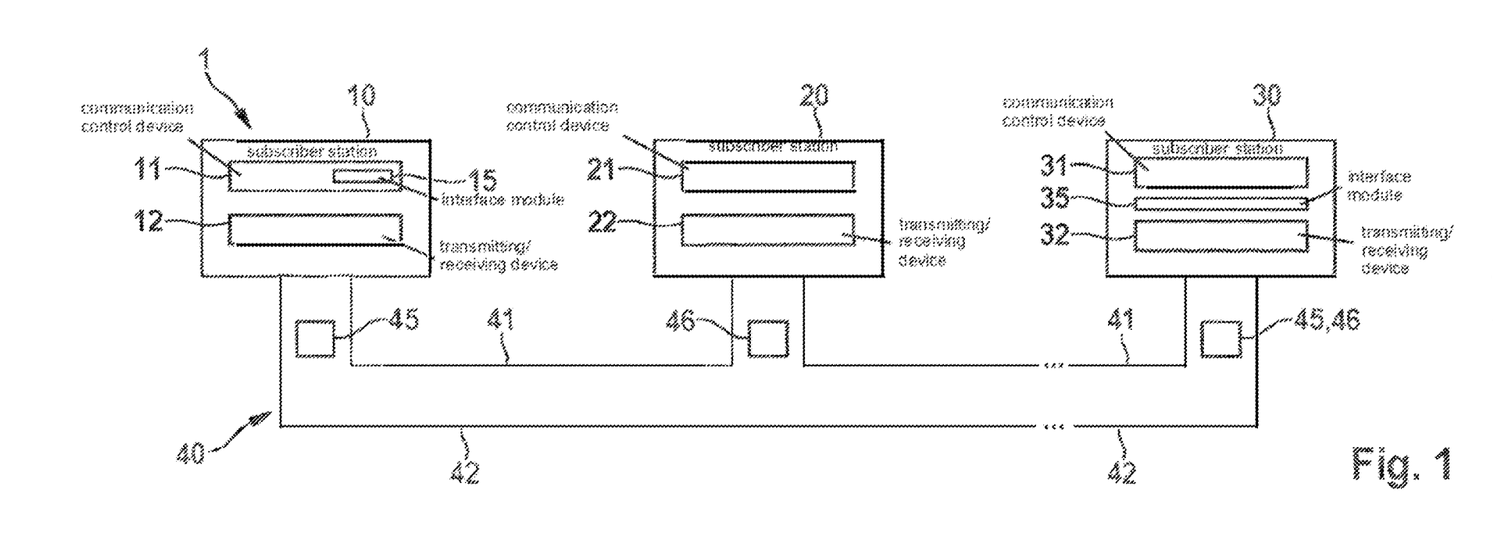
FIG. 1 shows a simplified block diagram of a bus system according to a first exemplary embodiment of the present invention

By way of example, FIG. 1 shows a bus system 1, which is in particular designed fundamentally for a CAN bus system, a CAN_FD bus system, a CAN_FD successor bus system, and/or modifications thereof, as described below. The CAN_FD successor bus system is hereinafter referred to as CAN_XL. The bus system 1 can be used in a vehicle, in particular a motor vehicle, an aircraft, etc., or in a hospital, etc.

In FIG. 1, the bus system 1 has a plurality of subscriber stations 10, 20, 30, each of which is connected to a bus 40 having a first bus wire 41 and a second bus wire 42. The bus wires 41, 42 can also be called CAN_H and CAN_L and are used for electrical signal transfer after coupling in the dominant levels or producing recessive levels for a signal in the transmitting state. Via the bus 40, messages 45, 46 are serially transferable in the form of signals between the individual subscriber stations 10, 20, 30. The subscriber stations 10, 20, 30 are, for example, control devices, sensors, display apparatuses, etc. of a motor vehicle.

As shown in FIG. 1, subscriber station 10 has a communication control device 11, a transmitting/receiving device 12, and an interface module 15. By contrast, the subscriber station 20 has a communication control device 21 and a transmitting/receiving device 22. The subscriber station 30 has a communication control device 31, a transmitting/receiving device 32, and an interface module 35. The transmitting/receiving devices 12, 22, 32 of the subscriber stations 10, 20, 30 are each connected directly to the bus 40, although this is not illustrated in FIG. 1.

In each subscriber station 10, 20, 30, the messages 45, 46 are encoded and exchanged in the form of frames via a TXD line and an RXD line in a bit-wise manner between the respective communication control device 11, 21, 31 and the associated transmitting/receiving devices 12, 22, 32. This is described in further detail below.

The communication control devices 11, 21, 31 each serve to control a communication of the respective subscriber station 10, 20, 30 via the bus 40 with at least one other subscriber station of the subscriber stations 10, 20, 30, which are connected to the bus 40.

The communication control devices 11, 31 create and read first messages 45, which are for example modified CAN messages 45, which are also subsequently called CAN_XL messages 45. Here, the modified CAN messages 45 or CAN_XL messages 45 are constructed on the basis of a CAN_FD successor format, which is described in further detail in relation to FIG. 2. The communication control devices 11, 31 can also be designed to provide a CAN_XL message 45 or a CAN_FD message 46 for the transmitting/receiving devices 12, 32, as needed, or to receive the former from the latter. The communication control devices 11, 31 thus create and read a first message 45 or a second message 46, wherein the first and second messages 45, 46 differ by their data transfer standard, namely in this case CAN_XL or CAN_FD.

The communication control device 21 can be embodied like a conventional CAN controller according to ISO 11898-1:2015, in particular like a CAN_FD tolerant Classical CAN controller or a CAN_FD controller. The communication control device 21 creates and reads second messages 46, for example, Classical CAN messages or CAN_FD messages 46. A number of 0 to 64 data bytes can be included in CAN_FD messages 46, which are also transferred at a significantly faster data rate than in a Classical CAN message. In the latter case, the communication control device 21 is embodied like a conventional CAN_FD controller.

The transmitting/receiving devices 12, 32 can be embodied as CAN XL transceivers, except for the differences described in further detail below. The transmitting/receiving devices 12, 32 can be implemented additionally or alternatively like a conventional CAN_FD transceiver. The transmitting/receiving device 22 can be embodied like a conventional CAN transceiver or CAN_FD transceiver.

With the two subscriber stations 10, 30, a formation and then transfer of messages 45 with the CAN_XL format as well as receipt of such messages 45 can be realized.

Figure 2:
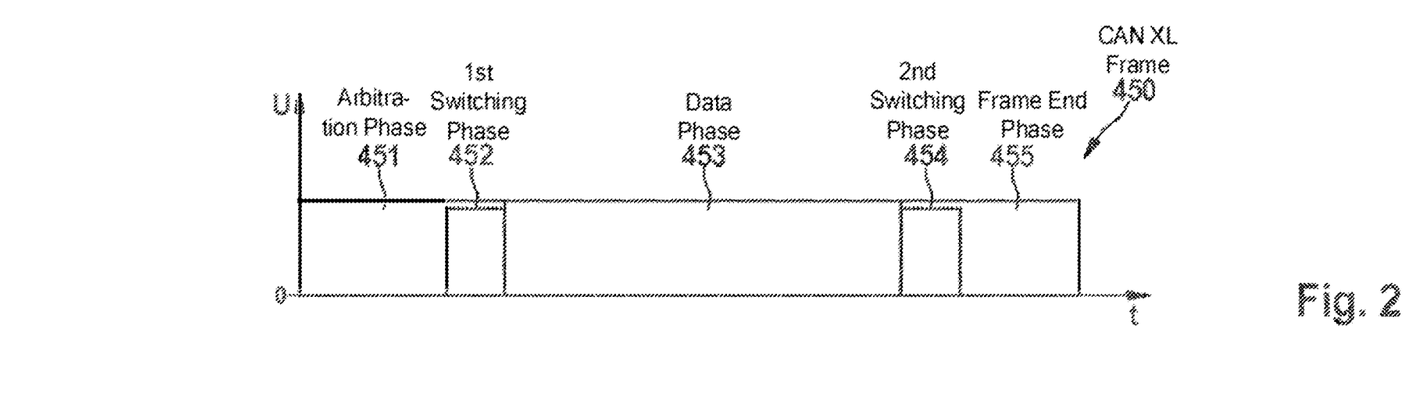
FIG. 2 shows a diagram illustrating the structure of messages that can be transmitted from subscriber stations of the bus system according to the first exemplary embodiment of the present invention.

FIG. 2 shows a CAN_XL frame 450 for the message 45, as transmitted by the transmitting/receiving device 12 or the transmitting/receiving device 32. The CAN_XL frame 450 is divided into different communication phases 451 to 455 for CAN communication on the bus 40, namely an arbitration phase 451, a first switching phase 452, a data phase 453, a second switching phase 454, and a frame end phase 455.

In the arbitration phase 451, for example, a bit is transmitted at the start, which is also called the SOF bit and displays the start of the frame. In the arbitration phase 451, an identifier is also transmitted with, for example, 11 bits in order to identify the transmitter of the message 45. During the arbitration, with the aid of the identifier, it is negotiated between the subscriber stations 10, 20, 30 in a bit-wise manner which subscriber station 10, 20, 30 wishes to transmit the message 45, 46 with the highest priority and therefore gains exclusive access to the bus 40 of the bus system 1 for the following period of time in order to transmit in the switching phase 452 and the subsequent data phase 453.

In the present exemplary embodiment, the switching from the arbitration phase 451 into the data phase 453 is prepared in the first switching phase 452. The switching phase 452 can have a bit that has the bit duration T_B1 of an arbitration phase 451 bit and is transmitted with the physical layer of the arbitration phase 451.

In the data phase 453, the bits of the frame 450 are transmitted with the physical layer of the data phase 453 and with a bit duration T_B2 that is shorter than the bit duration T_B1 of a bit of the arbitration phase 451. In the data phase 453, the payload of the CAN_XL frame 450 and of the message 45 is transmitted, respectively. The payload can also be referred to as the data field of the message 45. For this purpose, in the data phase 453, after a data field identifier that identifies the type of content in the data field, a for example 11-bit long data length code can be transmitted. For example, the code can have values from 1 to 2048, or any other value with an increment of 1. The data length code can alternatively comprise fewer or more bits, such that the range of values and the increment can have different values. There are subsequently additional fields, such as the header checksum field. Thereafter, the payload of the CAN_XL frame 450 and of the message 45, respectively, is transmitted. For example, at the end of the data phase 453, a checksum field can contain a checksum regarding the data of the data phase 453 as well as the data of the arbitration phase 451.

The transmitter of the message 45 can insert stuff bits as an inverse bit into the data stream after each of a predetermined number of the same bits, in particular 10 of the same bits. In particular, the checksum is a frame checksum F CRC, by means of which all bits of the frame 450 are safeguarded up to the checksum field.

In the present exemplary embodiment, the switching from the data phase 453 into the frame end phase 455 is prepared in the second switching phase 454. This means switching back to the transfer operating mode according to the arbitration phase 451. The switching phase 454 can have a bit that has the bit duration T_B1 of a bit of the arbitration phase 451 and is transmitted with the physical layer of the arbitration phase 451. However, a differentiation between CAN_XL frames or CAN frames or CAN_FD frames is not necessary here.

In the frame end phase 455, after two bits AL2, AH2 at least one Acknowledge bit ACK can be included in an end field. Thereafter, a sequence of 7 of the same bits can follow, indicating the end of the CAN_XL frame 450. With the at least one Acknowledge bit ACK, it can be communicated whether a receiver has or has not detected a fault in the received CAN_XL frame 450 or the message 45.

At least in the arbitration phase 451 and frame end phase 455, a physical layer is used, as in CAN and CAN-FD. In addition, in the switching phases 452, 454, at least in part, i.e. in the first switching phase 452 at the start and in the second switching phase 454 at the end, a physical layer can be used, as in CAN and CAN-FD. The physical layer corresponds to the bit transfer layer or Layer 1 of the conventional Open Systems Interconnection (OSI) model.

An important point during these phases 451, 452, 454, 455 is that the conventional CSMA/CR method is used, which allows simultaneous access of the subscriber stations 10, 20, 30 to the bus 40 without destroying the higher priority message 45, 46. As a result, further bus subscriber stations 10, 20, 30 can be relatively simply added to the bus system 1, which is very advantageous.

The CSMA/CR method results in the need to have so-called recessive states on the bus 40, which can be overwritten by other subscriber stations 10, 20, 30 with dominant states on the bus 40.

The arbitration at the start of a frame 450 or of the message 45, 46 and the acknowledgement in the frame end phase 455 of the frame 450 or of the message 45, 46 is only possible when the bit duration or bit time is significantly more than twice as long as the signal travel time between two arbitrary subscriber stations 10, 20, 30 of the bus system 1. Thus, the bit rate is selected to be slower in the arbitration phase 451, the frame end phase 454, and at least partially in the switching phases 452, 454 than in the data phase 453 of the frame 450. In particular, the bit rate in phases 451, 452, 454, 455 is selected to be 500 kbit/s, which results in a bit duration or bit time of approximately 2 μs, whereas the bit rate in data phase 453 is selected to be 5 to 10 Mbit/s or more, which results in a bit time of approximately 0.1 μs and shorter. Thus, the bit time of the signal in the other communication phases 451, 452, 454, 455 is greater by at least a factor of 10 than the bit time of the signal in the data phase 453.

A transmitter of the message 45, for example the subscriber station 10, does not begin to transmit bits of the switching phase 452 and the subsequent data phase 453 to the bus 40 until the subscriber station 10 as the transmitter has won the arbitration and the subscriber station 10 as the transmitter thus has exclusive access to the bus 40 of the bus system 1. The transmitter can either switch to the faster bit rate and/or the other physical layer after a portion of the shift phase 452 or can switch to the faster bit rate and/or the other physical layer only with the first bit, i.e. upon the start, of the subsequent data phase 453.

In general, the following deviating properties can be realized, in particular, in the bus system with CAN_XL compared to CAN or CAN_FD:

a) adoption and, if applicable, adaptation of proven properties that are responsible for the robustness and user friendliness of CAN and CAN_FD, in the particular frame structure with identifiers and arbitration according to the CSMA/CR method, b) increase of the net data rate to about 10 megabits per second, c) increase of the size of the payload per frame to about 2k bytes or to an arbitrary value.

Figure 3:
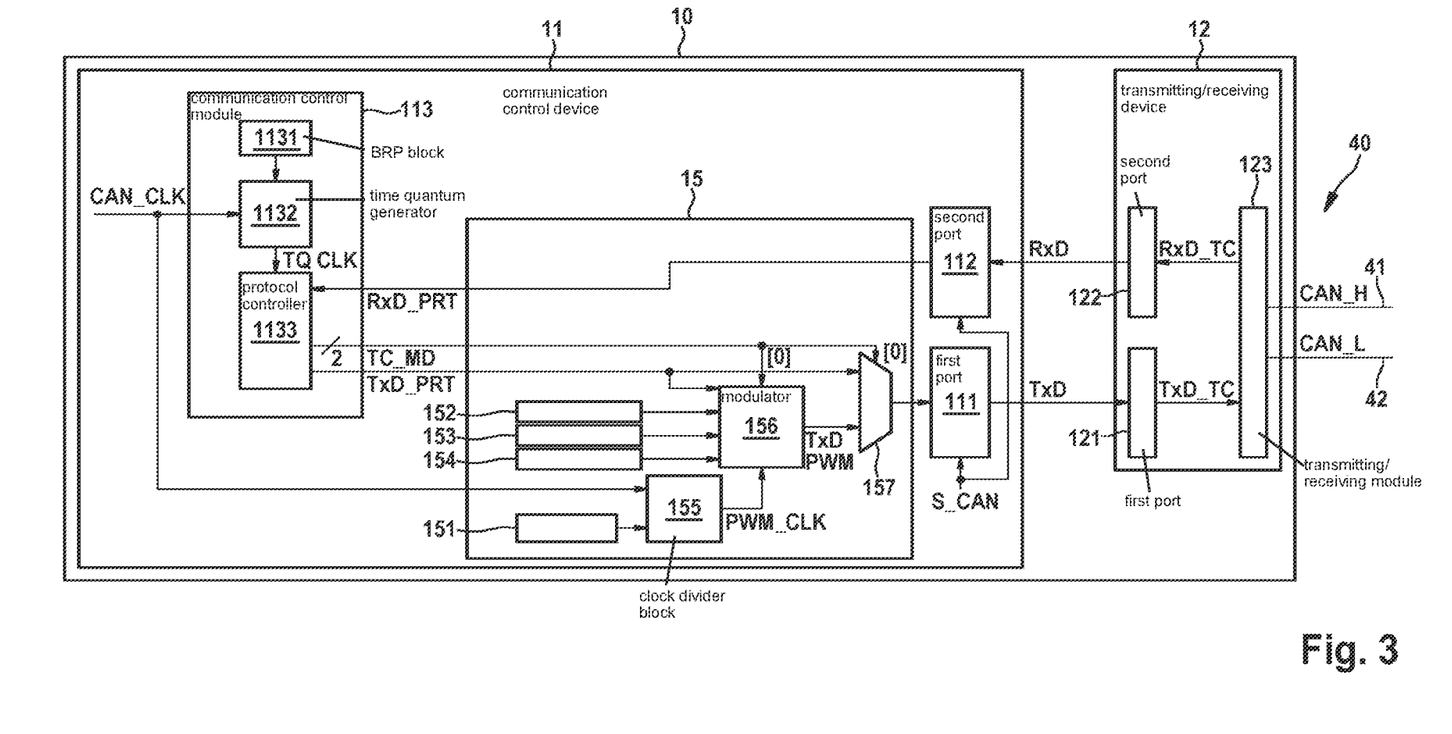
FIG. 3 shows a simplified schematic block diagram of a subscriber station of the bus system having an interface module according to the first exemplary embodiment of the present invention.

FIG. 3 shows the basic structure of the subscriber station 10 with the communication control device 11, the transmitting/receiving device 12, and the interface module 15.

The subscriber station 30 is structured in a similar manner as shown in FIG. 3, except that the interface module 35 is not integrated in the communication control device 31 but is rather provided separately from the communication control device 31 and the transmitting/receiving device 32. Therefore, the subscriber station 30 and the module 35 will not be described separately.

The functions of the interface module 15 described below are identical to the interface module 35.

Alternatively or additionally, it is possible that the interface module 15 is not integrated in the device 11, but is provided separately from the communication control device 11 and the transmitting/receiving device 12, as with the subscriber station 30.

The transmitting/receiving device 12 is connected to the bus 40, more precisely its first bus wire 41 for CAN_H and its second bus wire 42 for CAN_L. In the operation of the bus system 1, the transmitting/receiving device 12 converts a transmission signal TxD of the communication control device 11 into corresponding signals CAN_H and CAN_L for the bus wires 41, 42 and transmits these signals CAN_H and CAN_L to the bus 40. Although the signals CAN_H and CAN_L are mentioned here for the transmitting/receiving device 12, they are to be understood in relation to the message 45 as signals CAN-XL_H and CAN-XL_L, which in the data phase 453 deviate from the conventional signals CAN_H and CAN_L by at least one characteristic, in particular with respect to the formation of the bus states for the different data states of the signal TxDL and/or with respect to the voltage or the physical layer and/or the bit rate.

A differential signal VDIFF=CAN_H−CAN_L is formed on bus 40. With the exception of an idling or standby state, the transmitting/receiving device 12 in the normal operating mode always listens for a transfer of data or messages 45, 46 on the bus 40, regardless of whether or not the subscriber station 10 is the transmitter of the message 45. The transmitting/receiving device 12 forms a reception signal RxD from the signals CAN_H and CAN_L received from the bus 40 and transmits the reception signal to the communication control device 11, as described in further detail below.

The structure of the interface module 15 and the communication control device 11 and the subscriber station 10 as described below provides a robust and simple possibility of carrying out a signaling for a switching of the operating mode of the transmitting/receiving device 12 from the communication control device 11 to the transmitting/receiving device 12.

According to FIG. 3, in addition to the interface module 15, the communication control device 11 has a first port 111 for a digital transmission signal TxD, a second port 112 for a digital reception signal RxD, and a communication control module 114. The port 111 is an output port. The port 112 is an input port. The transmitting/receiving device 12 has a first port 121 for the digital transmission signal TxD, a second port 122 for the digital reception signal RxD, and a transmitting/receiving module 123. The port 121 is an input port. The port 122 is an output port.

The communication control device 11 is configured as a micro-controller or has a micro-controller. The communication control device 11 processes signals of an arbitrary application, for example, a control device for a motor, a safety system for a machine or vehicle, or other applications. However, a system ASIC (ASIC=application-specific integrated circuit) is not shown, which can alternatively be a system base chip (SBC) on which several functions necessary for an electronic assembly of the subscriber station 10 are aggregated. The system ASIC can include, but is not limited to, the transmitting/receiving device 12 and a power supply device (not shown) that supplies electrical power to the transmitting/receiving device 12. The power supply device typically supplies a voltage CAN_Supply of 5 V. However, the power supply device can supply a different voltage with a different value and/or can be configured as a power source, as needed.

The transmitting/receiving device 12 also has a transmitting/receiving module 123 for transmitting the transmission signal TxD to the bus 40 and/or for receiving the signals CAN_H, CAN_L from the bus 40. The transmitting/receiving module 123 carries out the connection to the physical medium, i.e. the bus 40 having the bus wires 41, 42. The transmitting/receiving module 123 drives and decodes the signals CAN_H and CAN_L for the bus wires 41, 42 or bus 40.

The communication control module 113 has a bit rate prescaler block 1131 or BRP block 1131, a time quantum generator 1132, and a protocol controller 1133. In the BRP block 1131, a bit rate prescaler (BRP) from 1 to 64 is configurable. The time quantum generator 1132 receives the configured bit rate prescaler (BRP) and the clock signal CAN_CLK and produces a time quantum clock signal TQ_CLK from the former. The time quantum generator 1132 outputs the time quantum clock signal TQ_CLK to the protocol controller 1133. The protocol controller 1133 implements the CAN protocol, in particular the protocol for CAN_XL or CAN_FD. The communication control module 113, more precisely the protocol controller 1133, is designed to output the following output signals or receive the following input signals.

The signal TxD_PRT is an output signal that corresponds to the transmission signal TxD. The communication control module 113, more precisely the protocol controller 1133, outputs the signal TxD_PRT to the interface module 15.

The signal RxD_PRT is an input signal that corresponds to the reception signal RxD. The communication control module 113, more precisely the protocol controller 1133, receives the signal RxD_PRT from the interface module 15. Alternatively, the communication control module 113, more precisely the protocol controller 1133, receives the signal RxD_PRT directly from the second port 112.

In addition to these signals, the communication control module 113 is designed to produce and output a control signal TC_MD. The control signal TC_MD indicates whether or not the transmitting/receiving device 12 is to be operated in the data phase operating mode 453_B.

In the data phase 453, the transmitting/receiving device 12 can be configured in the operating mode 453_TX or TX-DataPhaseMode. The operating mode 453_TX is also called FAST_TX mode or first operating mode. In the operating mode 453_TX or TX-DataPhaseMode, the subscriber station 10 has won the arbitration in the arbitration phase 451 and is the transmitter of the frame 450 in the subsequent data phase 453. In this case, the subscriber station 10 can also be referred to as the transmission node. Alternatively, in the data phase 453, the transmitting/receiving device 12 can work in the operating mode 453_RX or RX-DataPhaseMode. The operating mode is also called FAST_RX mode or second operating mode. In operating mode 453_RX or RX-DataPhaseMode, the subscriber station 10 has lost the arbitration in the arbitration phase 451 and in the subsequent data phase 453 is only a receiver, i.e. not a transmitter, of the frame 450. In this case, the subscriber station 10 can also be referred to as the reception node.

The switching for signaling the operating mode to be switched on to transmitting/receiving device 12 is carried out with the interface module 15, as explained below.

The interface module 15 has at least one configuration register 151, 152, 153, 154 for storing parameters for a configuration and output, as needed. For example, the at least one configuration register 151, 152, 153, 154 is a PWM bit rate prescaler register 151 or PWM BRP register 151, a PWM offset configuration register 152, a PWM Phase1 configuration register 153, or a PWM Phase2 configuration register 154. Of course, it is possible that at least one of the configuration registers 151, 152, 153, 154, or at least one additional configuration register for other configuration parameters can be used. The interface module 15 also has a clock divider block 155 or prescaler block, a modulator 156, and a multiplexer 157.

The interface module 15 receives the aforementioned signals, which are output by the communication control module 113. In addition, the interface module 15, more precisely its clock divider block 155, receives the clock signal CAN_CLK.

Thus, the interface module 15 operates at the same clock frequency CAN_CLK as the communication control module 113, more precisely the protocol controller 1133. With the parameters in the configurable configuration registers 151 to 154, a modulation carried out by the modulator 155 is configurable. The configuration parameters of the configuration registers 153 to 155 allow the bit lengths (bit times or bit durations) in the arbitration phase 451 and data phase 453 of a frame 450 to be independent from one another. The modulator 155 can thus modulate the signal TxD_PRT at least intermittently, in particular with pulse-width modulation. The modulator 155 outputs the transmission signal TxD_PWM produced according to the configuration parameters of the configuration registers 151 to 154 to the multiplexer 157.

The multiplexer 157 is controlled by the communication control module 113, more precisely the protocol controller 1133. Based on the control by the communication control module 113, more precisely the protocol controller 1133, the multiplexer 157 outputs the modulated signal TxD-PWM or the non-modulated signal TxD-PRT to the transmitting/receiving device 12 via the output port 111.

Here, the communication control module 113, more precisely the protocol controller 1133, controls the multiplexer 157 outside of the data phase 453, in particular in the arbitration phase 451, such that the signal TxD_PRT is passed directly to the transmitting/receiving device 12. In the data phase 453, the communication control module 113, more precisely the protocol controller 1133, controls the multiplexer 157 such that the interface module 15 passes a modulated signal TxD_PWM to the transmitting/receiving device 12.

Figure 4:
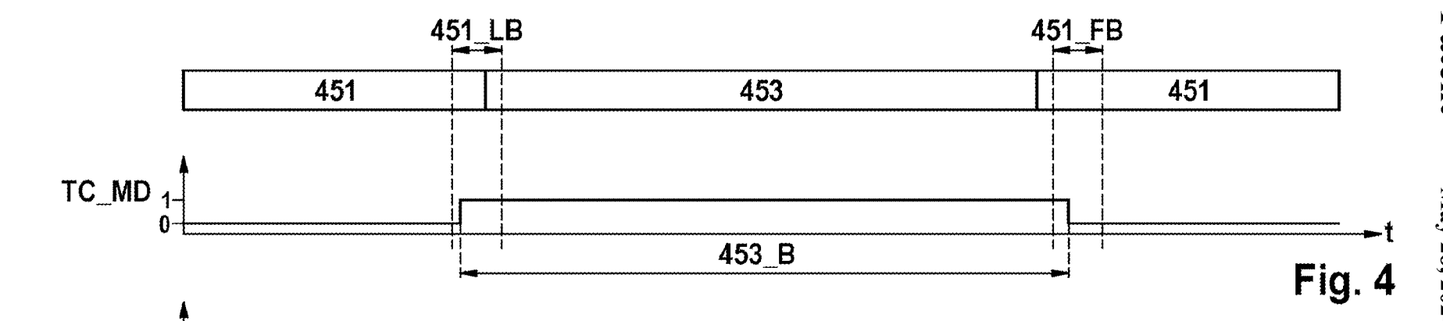
FIG. 4 shows a temporal representation of the sequence of communication phases upon transmission of a message in the bus system according to the first exemplary embodiment and the associated control signal for switching the operating mode of a transmitting/receiving device of the subscriber station of FIG. 3.

FIG. 4 shows the control signal TC_MD, which indicates whether or not the transmitting/receiving device 12 is to be operated in data phase operating mode 453_B. For this purpose, the control signal TC_MD changes its level in the last bit 451_LB of the arbitration phase 451. In the example of FIG. 4, the control signal TC_MD switches from level 0 to level 1 in the last bit 451_LB of the arbitration phase 451. The control signal TC_MD then changes its level again only in the first bit 451_FB of the next arbitration phase 451. In the example of FIG. 4, the control signal TC_MD switches from level 1 to level 0 in the first bit 451_FB of the next arbitration phase 451.

Thus, according to the example of FIG. 4, the control signal TC_MD denotes with the value '1' that the transmitting/receiving device 12 is to be operated in operating mode 453_B of the data phase 453. With the value '0', the control signal TC_MD according to the example of FIG. 4 denotes that the transmitting/receiving device 12 is to be operated in the operating mode 453_1 of the arbitration phase 451.

In other words, the operating mode 453_B of the data phase 453 of the transmitting/receiving device 12 already begins in the last bit 451_LB of the arbitration phase 451, continues for the duration of the data phase 453 of the frame 450, and ends only in the first bit 451_FB of the following arbitration phase 451, as shown in FIG. 4. Thus, the bit rate of the protocol controller 1133 and the operating mode or physical layer of the transmitting/receiving device 12 are not switched simultaneously.

Figures 5, 6:
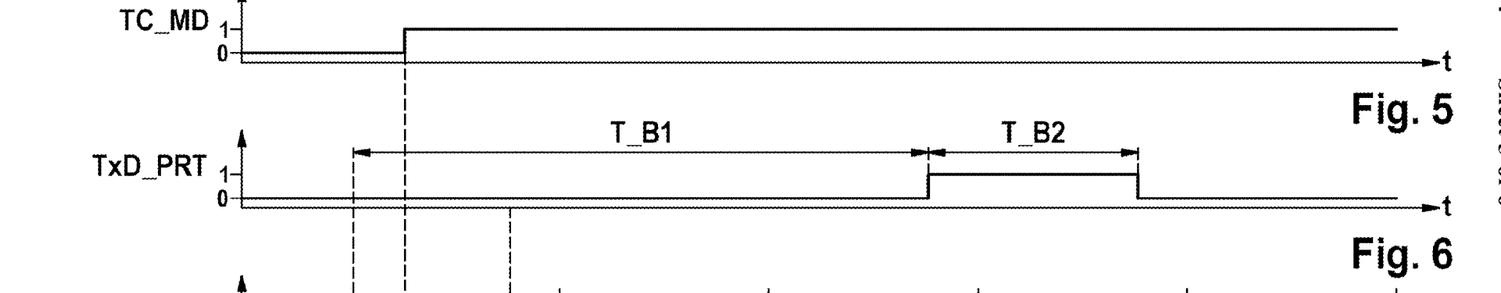
FIG. 5 to FIG. 7 show a temporal representation of signals upon a switch of the operating mode of the transmitting/receiving device of the subscriber station of FIG. 3.

FIG. 5 shows the control signal TC_MD upon switching from the arbitration phase 451 into the data phase 453. According to the example of FIG. 6, a bit having the bit duration or bit time T_B1 of the arbitration phase 451 is initially transmitted in the transmission signal TxD_PRT; within this bit, the operating mode of the transmitting/receiving device 12, in particular the operating mode of its transmitting/receiving module 123, is switched. This is followed by bits having the bit duration or bit time T_B2 in the data phase 453. In the example of FIG. 6, the bits with bit duration T_B1 are longer than the bits with bit duration or bit time T_B2. Thus, the bits or data in the data phase 453 are transmitted and transferred via the bus 40 faster than in the arbitration phase 451. However, as desired, other values for deriving the bit durations or bit times T_B1, T_B2 are adjustable in the configuration registers 151 to 154, as described above and below.

As shown in FIG. 6, the signal TxD_PRT is NRZ encoded at the output of the protocol controller 1133 (NRZ=Non-Return-to-Zero). Thus, the signal TxD_PRT is stable for a bit time. Edges do not occur until the signal changes its level (state), i.e. changes from 0 to 1 or changes from 1 to 0.

Figure 7:
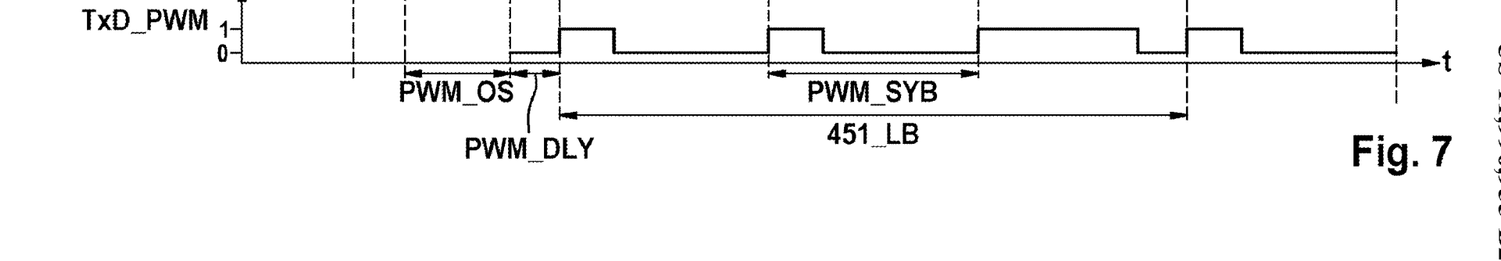

When the device 11 of the transmitting/receiving device 12 is to signal that the transmitting/receiving device 12 must switch into the operating mode 453_B for the data phase 453, in particular of frame 450, the modulator 156 is employed. The modulator 156 is designed to perform a pulse-width modulation (PWM) of the transmission signal TxD_PRT of the protocol controller 1133. As mentioned above, the modulator 156 outputs a signal TxD_PWM, for example as shown in FIG. 7. The signal TxD_PWM has a time offset PWM_OS and a modulation delay PWM_DLY, which will be described in further detail below. In the last bit 451_LB of the arbitration phase 451, the information for the transmitting/receiving device 12 is included with symbols PWM_SYB regarding into which operating mode 453_B the transmitting/receiving device 12, in particular its transmitting/receiving module 123, is to switch.

In the example of FIG. 7, the symbols PWM_SYB have a duration of approximately one bit duration or bit time T_B2 of the data phase 453. In addition, three symbols PWM_SYB are included in the last bit 451_LB of the arbitration phase 451. The symbols PWM_SYB signal different values. Thus, in addition to the various operating modes 453_B for the data phase 453, more information can be signaled to the transmitting/receiving device 12.

The transmitting/receiving device 12, in particular its transmitting/receiving module 123, is designed to demodulate the modulated signal TxD_PWM and to detect the modulation in the resulting modulated signal TxD_PWM.

Based on the information in the modulated signal TxD_PWM, transmitting/receiving device 12, in particular its transmitting/receiving module 123, switches its operating mode. In addition, the transmitting/receiving device 12, in particular its transmitting/receiving module 123, is designed to transmit the demodulated signal TxD_TC onto bus 40 when the transmitting/receiving device 12, in particular its transmitting/receiving module 123, is to be switched into operating mode 453_TX (transmission node). If the subscriber station 10 in the data phase 453 is only a receiver (reception node), as described above, the transmitting/receiving device 12, in particular its transmitting/receiving module 123, only switches its input comparator into the operating mode 453_RX. Here, the reception threshold(s) of the input comparator is/are switched to other reception levels. However, the settings for the transmitting/receiving device 12 for transmitting need not be changed.

Figures 8, 9:
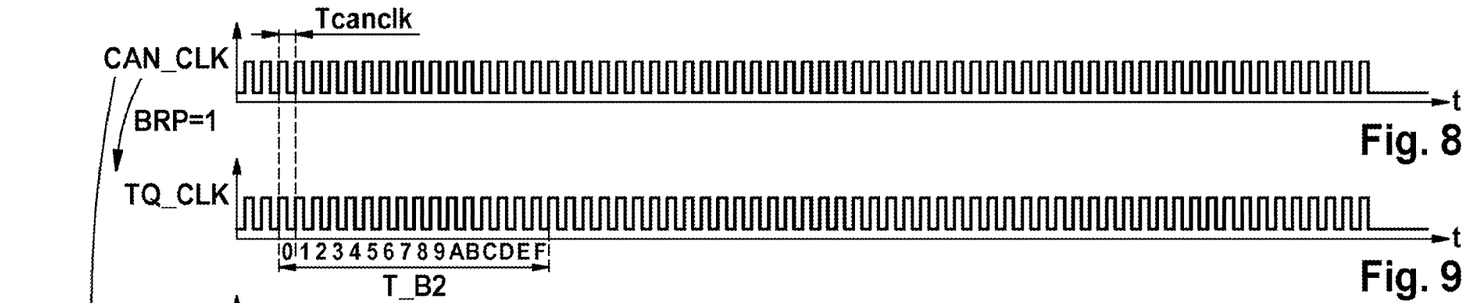
FIG. 8 to FIG. 12, respectively, show a temporal representation of signals and states at the subscriber station of FIG. 3 in order to illustrate a PWM encoding of a transmission signal of a subscriber station in the data phase of a message transmitted via the bus of the bus system.
Figure 10:
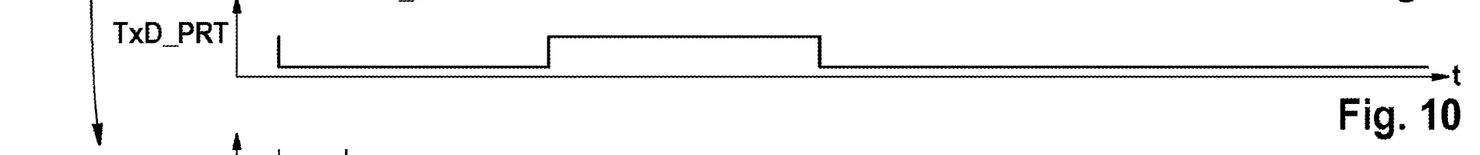

FIGS. 8 to 10 illustrate the functionality of the modulator 156 for producing the modulated signal TxD_PWM of FIG. 7.

According to FIG. 8, the clock signal CAN_CLK has a clock period Tcanclk. Because, in the example of FIG. 9, a BRP=1 is selected in the register 151, a clock period Tcanclk is equal to a clock period of the time quantum clock signal TQ_CLK. For example, the time quantum clock signal TQ_CLK provides 16 time quanta TQ for a bit time T_B1 in the arbitration phase 451, as seen in conjunction with FIG. 10 for the signal TxD_PRT. Thus, each bit of signal TxD_PRT is subdivided into 16 time quanta TQ.

Figure 11:
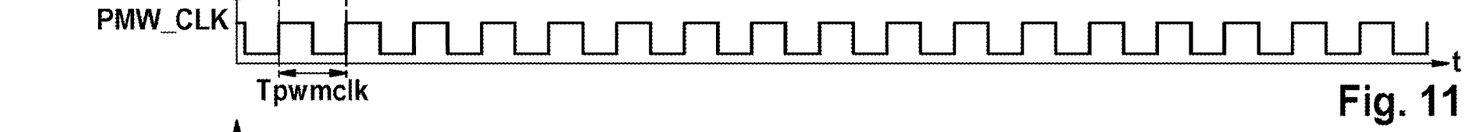

According to the example of FIG. 11, the clock divider block 155 with a setting parameter=4 produces a PWM clock signal PWM_CLK having a clock period Tpwmclk. Thus, in the example of FIG. 8 to FIG. 11, Tpwmclk=4*Tcanclk.

Figure 12:
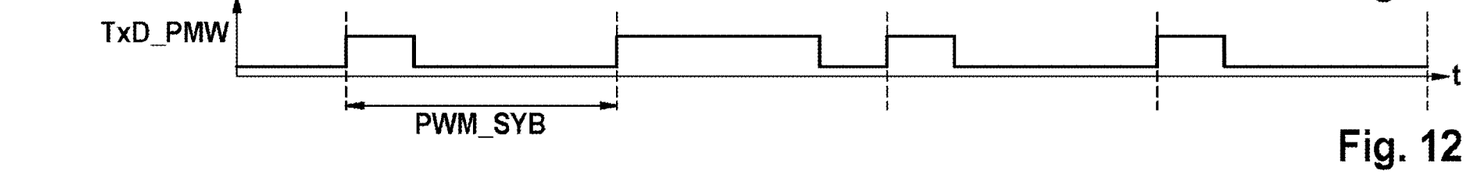

Using this PWM clock signal PWM_CLK, the modulator 156 produces, for example, the modulated transmission signal TxD_PWM of FIG. 12. Here, the states D_0 of the digital signal TxD_PWM are produced according to the principle of FIG. 13. The states D_1 of the digital signal TxD_PWM are produced according to the principle of FIG. 14.

Figure 13:
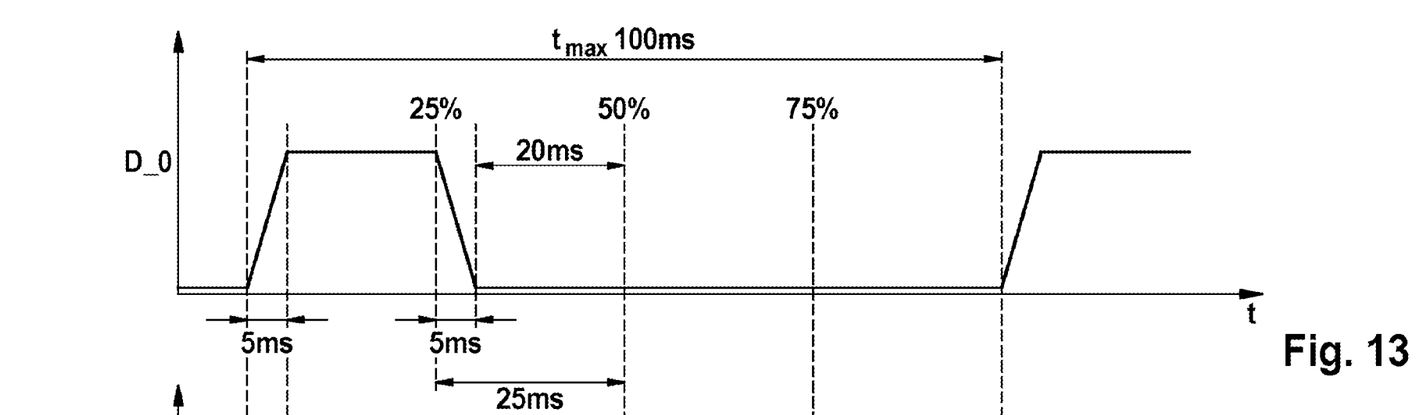
FIG. 13 and FIG. 14 show a temporal representation of an encoding of the Data 0 and Data 1 states by means of pulse-width modulation (PWM).
Figure 14:
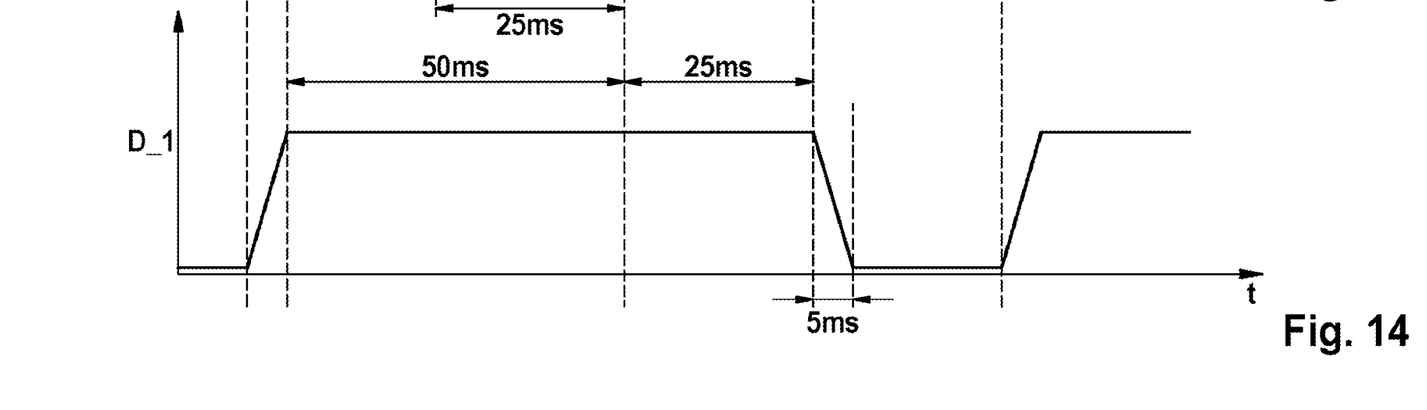

In the example of FIG. 12, there are two PWM symbols of fixed length, each divided into a Phase1 (high phase) and a Phase2 (low phase), as also illustrated in FIG. 13 and FIG. 14. A digital '0' is shown in FIG. 13, for example, as a short high phase and a long low phase (D_0). For the digital '1,' it is reversed. Thus, the digital '1' in FIG. 14 is depicted as a short low phase and a long high phase (D_1).

For example, if the entire symbol PWM_SYB has a length of four clock pulses, the Phase1, Phase2 of FIG. 13 and FIG. 14 are either 1 or 3 clock pulses Tpwmclk long, respectively. The length of Phase1 is adjustable in the PWM Phase1 configuration register 153. The length of Phase1 is adjustable in the PWM Phase2 configuration register 154.

In this way, a CAN bit time T_B1 or T_B2 can be transferred as a single symbol PWM_SYB or as multiple symbols PWM_SYB. A bit time T_B1 or T_B2 must always be an integer multiple of the symbol length of a symbol PWM_SYB. Thus, by configuring the lengths of Phase1, Phase2 in the registers 153, 154, the length of the bit times T_B1, T_B2 is also ultimately set. The interface module 15 operates at the same clock frequency as the protocol controller 1133.

There are various options for the configuration of the PWM_SYB symbols. According to a first option, Phase1, Phase2 of the symbol PWM_SYB are configured separately.

According to a second option, the symbol length and the length of one of the two phases Phase1, Phase2 of the symbol PWM_SYB is configured. The other phase is then calculated as the difference between the two configured lengths.

Of course, other configurations or registers 151 to 154 are possible in order to perform the aforementioned modulation of the modulator 156.

An additional configuration parameter is the offset PWM_OS according to FIG. 7. This configuration parameter is an offset in clock periods of the clock signal PWM_CLK Tpwmclk. The offset PWM_OS serves to start the modulation of the signal TxD_PRT at a time delay, such that the phase shift between the bits of the signal TxD_PRT in the data phase 453 and the symbols PWM_SYB on the modulated transmission signal TxD_PWM is minimized, as shown in FIG. 7.

The major advantage of the configurable offset PWM_OS is that the configuration of the offset PWM_OS can also compensate for a phase shift that would arise when the bit time T_B1 of the arbitration phase 451 is not an integer multiple of the bit time T_B2 in the data phase 453. Consequently, the two bit times T_B1, T_B2 can be adjusted arbitrarily for a user of the module 15 and the communication control device 11 and the subscriber station 10, respectively. The module thus offers full flexibility for the subscriber station 10.

The configuration registers 151 to 154 allow for the optimization of the modulation parameters in the operation of subscriber station 10.

According to a first modification of the aforementioned configuration of the modules 15, 16, it is possible that at least one of the modules 15, 16 enables only a switch to the operating mode 453_TX or TX-DataPhaseMode. Such a variant can be advantageous for a subscriber station 10, 20 of the bus system 1, for example, which itself only needs to transmit signals, but does not need to receive signals from the bus 40 in order to perform its function. An example of the configuration of such a subscriber station is a pure control element, whose control is transferred via the bus 40 but receives or produces the event for the control device independent of the communication on the bus.

According to a second modification of the aforementioned configuration of the modules 15, 16, it is possible that at least one of the modules 15, 16 enables only a switch into operating mode 453_RX or RX-DataPhaseMode. Such a variant can be advantageous for a subscriber station 10, 20 of the bus system 1, for example, which itself does not need to transmit signals, but only needs to receive signals from the bus 40 in order to perform its function. An example of the configuration of such a subscriber station is an encoder, in particular a rotary encoder, an actuator, etc.

Of course, the functions of the devices 11, 12 described above are also usable for a modification of CAN_FD and/or CAN, at least for transmitting the payload.

Figure 15:
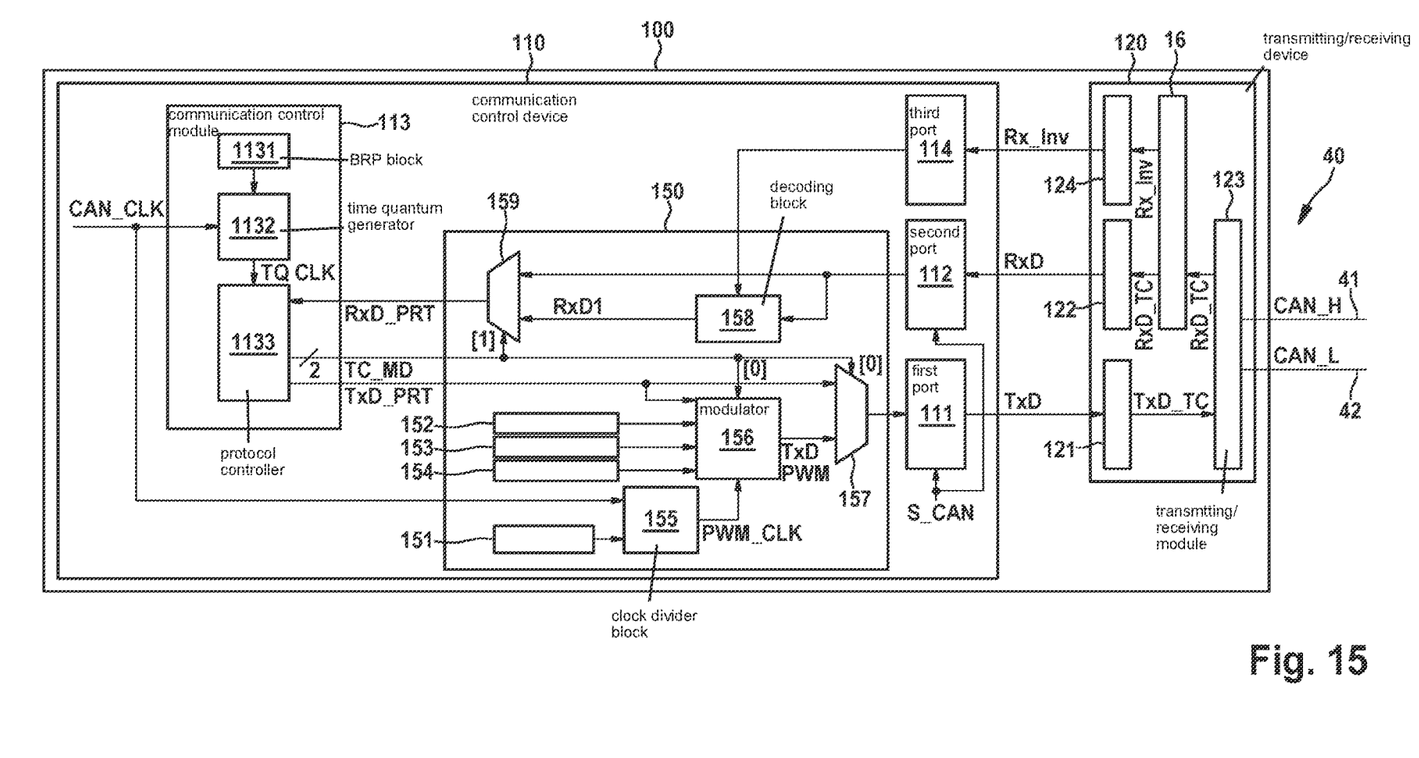
FIG. 15 shows a simplified schematic block diagram of a subscriber station of the bus system having an interface module according to a second exemplary embodiment of the present invention.

FIG. 15 shows the basic construction of a subscriber station 100 having its communication control device 110 and its transmitting/receiving device 120, as well as an interface module 150.

The structure of the subscriber station 100 described below provides a robust and simple possibility of symmetrically transferring bits of signals between the communication control device 110 and the transmitting/receiving device 120. This is particularly advantageous during the transfer of data during the data phase 453 of a frame 450.

In contrast to the subscriber station 10, the communication control device 110 additionally has a third port 114. The port 114 is an input port. Optionally, the port 114 is a port that is switchable either as an input or as an output.

In addition to the transmitting/receiving device 12 of the above-described exemplary embodiment, the transmitting/receiving device 120 has a coding block 16, which is connected between the ports 121, 122, 124 and the transmitting/receiving module 123. Thus, the transmitting/receiving device 120 additionally has a third port 124. The port 124 is an output port. Optionally, the port 124 is switchable either as an input or as an input [sic]. The coding block 16 can be designed to select the transfer direction of the third port as a function of the operating mode in which the transmitting/receiving device is switched in the second communication phase.

In addition to the interface module 15 of the above-described embodiment, the interface module 150 has a decoding block 158 and a multiplexer 159.

The reception signal RxD_TC of the transmitting/receiving device 120 is output to the device 11 via the ports 122, 124, which can also be called RxD and Rx_Inv, as a differential signal. Rx_Inv always has the inverse value of the signal RxD_TC. From the two signals RxD, Rx_Inv in the interface module 150, a single digital signal RxD1 is then decoded again.

Due to the design of the subscriber station 10, the transmitting/receiving module 123 can transmit a frame 450 received from the bus 40 to the communication control module 113 as a differential signal RxD, Rx_Inv via the ports 122, 124, 112, 114. Thus, the communication control module 113 can receive a frame 450 transmitted via the bus 40 as a differential signal via the ports 111, 112, as described in further detail below.

The coding block 16 produces a signal Rx_Inv from a signal RxD_TC, i.e. the reception signal RxD. The signal Rx_Inv is an inverse signal to the signal RxD_TC. The coding block 16 outputs the signal Rx_Inv to the port 124. In doing so, the transmitting/receiving device 12 can output the signals RxD, Rx_Inv as a differential output signal to communication control device 11 via ports 122, 124. In the simplest case, the coding block 16 is an inverter that inverts the signal RxD_TC.

The decoding block 158 of the interface module 150 is connected to the ports 112, 114 at its input. From the ports 112, 114, the decoding block 158 receives a differential input signal consisting of the signal RxD and the signal Rx_Inv. The decoding block 158 decodes the signals RxD, Rx_Inv to form the non-differential signal RxD1. The decoding block 158 outputs signal RxD1 to the multiplexer 159.

The protocol controller 1133 actuates the multiplexer 159 with the control signal TC_MD. Based on the signal value of the control signal TC_MD, it is selected whether the protocol controller 1133 is provided with the signal RxD1 decoded by the decoding block 158 or the signal RxD from the port 122 as the signal RxD_PRT.

Optionally, the transmitting/receiving module 123 transmits the differential signal RxD, Rx_Inv via the ports 122, 124 to the communication control device 11 only in the operating mode 453_B of the data phase 453.

The purpose of this transfer as a differential signal is to keep the signal travel times for the two signal edges from 0 to 1 and from 1 to 0 as symmetrical as possible on the way from the transmitting/receiving module 123 via the connection lines between the devices 11, 12, as well as via the pad cells of the integrated circuits (ICs). A high symmetry of the edges is intended to prevent one of the two bus levels from being so shortened by asymmetric travel times that it can no longer be sampled reliably.

Depending on the application, the two multiplexers 157, 159 can be controlled by the same signal, in particular the control signal TC_MD, or by two different signals.

Otherwise, communication can occur in the subscriber station 10, 30, and in the bus system 1, as described with respect to the first exemplary embodiment.

According to a third exemplary embodiment, an STB port is used for the ports 114, 124, respectively, said STB port being provided at the devices 110, 120 for transmitting an operating mode signaling signal to transmitting/receiving device 120.

In this case, when no CAN_XL communication is occurring, the device 110 can drive the STB port to signal to the transmitting/receiving device 120 that the transmitting/receiving device is to be switched into a standby state or back into the active state. In the standby state, no communication occurs on bus 40. In the active state, the device 110 operates the port STB as an input, and the transmitting/receiving device then uses the port for the differential transfer of the RxD_TC signal. Thus, the device 110 of the transmitting/receiving device can signal into which operating mode or state the transmitting/receiving device is to be switched as a function of the communication on the bus.

Due to the design of the subscriber station 100, no galvanic connection via an additional port on the communication control device 110 and the associated transmitting/receiving device 120 is required, so that the communication control device 110 of the transmitting/receiving device 120 can signal that the switching into another operating mode of the transmitting/receiving device 120 is to be carried out. Furthermore, no additional port on the communication control device 110 and the associated transmitting/receiving device 120 is required in order to ensure the symmetry of the data transfer between the devices 110, 120. That is to say, advantageously, no additional port that is not already available on a standard housing of the devices 110, 120 is required. A change to another, larger and cost-intensive, housing is thus not necessary in order to provide an additional port.

Due to the described design of the device(s) 110, 120, far higher data rates can be achieved in the data phase 453 than with CAN or CAN-FD. In addition, the data length in the data field of the data phase 453 can be chosen arbitrarily, as described above. As a result, the advantages of CAN in terms of arbitration can be retained, and yet a greater amount of data can be transferred in less time than before in a very secure and effective manner, that is to say, without the need to repeat the data due to a fault.

Otherwise, the communication can occur in the subscriber station 10, 30 and in the bus system 1, as described with respect to the first or second exemplary embodiment.

All of the above-described designs of the devices 11, 12, 31, 32, the modules 15, 16, 35, the subscriber stations 10, 20, 30, the bus system 1, and the method carried out therein can be used individually or in all possible combinations. In particular, all features of the described above exemplary embodiments and/or modifications thereof can be combined arbitrarily. In addition or alternatively, the following modifications are possible, in particular.

Although the present invention is described above using the example of the CAN bus system, the present invention can be employed in any communication network and/or communication method in which two different communication phases are used, in which phases the bus states produced for the different communication phases differ. In particular, the above-described principle of the present invention is usable for interfaces, which require a switchover signal from a protocol controller or module 113 for different communication phases and/or require in the process a data exchange between devices 11, 12.

The bus system 1 described above according to the exemplary embodiments is described using a bus system based on the CAN protocol. However, the bus system 1 according to the exemplary embodiments can also be a different type of communication network in which data are serially transferable at two different bit rates. It is advantageous, but not necessarily a precondition, for the bus system 1 to ensure an exclusive, collision-free access of a subscriber station 10, 20, 30 to a common channel for at least certain periods of time.

The number and arrangement of the subscriber stations 10, 20, 30 in the bus system 1 of the exemplary embodiments is arbitrary. In particular, the subscriber station 20 in the bus system 1 can be omitted. It is possible that one or more of the subscriber stations 10 or 30 can be present in the bus system 1. It is possible that all subscriber stations in the bus system 1 are designed identically, i.e. only the subscriber station 10 or only the subscriber station 30 are present.

What is claimed is:

1. An interface module for a communication control device of a subscriber station, which is one of a plurality of subscriber stations of a serial bus system, comprising:
    at least one configuration register; and
    a modulator configured to receive input of a transmission signal and to modulate the transmission signal to form a modulated transmission signal, which has a bit time of a second communication phase of a frame with which messages are exchanged between the subscriber stations of the bus system, the bit time being configured in the at least one configuration register and differing from a bit time of a first communication phase of the frame;
    wherein the interface module is configured to output the transmission signal, input into the modulator, to a transmitting/receiving device of the subscriber station, in the first communication phase, in order to transmit the transmission signal onto a bus of the bus system; and
    wherein the interface module is configured to output the modulated transmission signal produced by the modulator to the transmitting/receiving device of the subscriber station, in the second communication phase, to transmit the modulated transmission signal onto the bus of the bus system.

2. The interface module according to claim 1, further comprising:
    a first multiplexer configured to receive a control signal from the communication control device and to receive the transmission signal and the modulated transmission signal, and to output either the transmission signal or the modulated transmission signal, as a function of the control signal, to the transmitting/receiving device.

3. The interface module according to claim 2, further comprising:
    a decoding block configured to receive a digital reception signal produced by the transmitting/receiving device from a signal received from the bus and a reception signal inverse to the digital reception signal, and configured to decode a resulting differential signal to form a non-differential reception signal; and
    a second multiplexer configured to output the non-differential signal produced by the decoding block to the communication control device when the transmitting/receiving device is switched to an operating mode of the second communication phase.

4. The interface module according to claim 3, wherein the interface module is configured such that the first and second multiplexers are controlled by the same control signal.

5. The interface module according to claim 1, further comprising:
    a clock divider block configured to produce a clock signal based on: (i) another clock signal using which the communication control device produces the transmission signal, and (ii) a parameter configured in the at least one configuration register, wherein the modulator is designed to produce the modulated transmission signal based on the clock signal produced by the clock divider block.

6. The interface module according to claim 1, wherein: the modulator is configured for pulse-width modulation of the transmission signal; and
(i) the at least one configuration register has at least two parameters for determining a length of two phases of a PWM symbol, and/or (ii) the at least one configuration register has a modulation offset as a parameter for the pulse-width modulation of the modulator.

7. A communication control device for a subscriber station which is one of a plurality of subscriber stations of a serial bus system, the communications control device comprising:
a communication control module configured to produce a transmission signal for controlling a communication of the subscriber station with at least one other subscriber station of the bus system; and
an interface module, including:
at least one configuration register; and
a modulator configured to receive input of the transmission signal and to modulate the transmission signal to form a modulated transmission signal, which has a bit time of a second communication phase of a frame with which messages are exchanged between the subscriber stations of the bus system, the bit time being configured in the at least one configuration register and differing from a bit time of the first communication phase of the frame;
wherein the interface module is configured to output the transmission signal, input into the modulator, to a transmitting/receiving device of the subscriber station, in the first communication phase, in order to transmit the transmission signal onto a bus of the bus system;
wherein the interface module is configured to output the modulated transmission signal produced by the modulator to the transmitting/receiving device of the subscriber station, in the second communication phase, to transmit the modulated transmission signal onto the bus of the bus system; and
wherein the communication control module is configured to produce a control signal and to output the control signal to the interface module, the control signal indicating when the modulated transmission signal produced by the modulator is to be output to the transmitting/receiving device of the subscriber station.

8. The communication control device according to claim 7, wherein an operating mode signaling signal signals to the interface module into which operating mode the transmitting/receiving device is to be switched as a function of the communication on the bus.

9. The communication control device according to claim 7, further comprising:
a first port for transmitting the transmission signal to the transmitting/receiving device;
a second port for receiving a digital reception signal from the transmitting/receiving device; and
a third port for receiving a digital reception signal inverse to the digital reception signal from the transmitting/receiving device, which is provided for signaling a standby state to the transmitting/receiving device, in which state no communication occurs on the bus.

10. The communication control device according to claim 7, wherein the communication control module is configured to produce the transmission signal in the first communication phase with bits having a first bit time that is greater by at least a factor of 10 than a second bit time of bits produced by the communication control module in the second communication phase in the transmission signal.

11. A transmitting/receiving device for a subscriber station, which is one of a plurality of subscriber stations of a serial bus system, the transmitting/receiving device comprising:
a transmitting/receiving module configured to transmit a transmission signal onto a bus of the bus system, in which bus system at least a first communication phase and a second communication phase are used in order to exchange messages between the subscriber stations of the bus system, and to produce a digital reception signal from a signal received from the bus;
a first port for receiving the transmission signal from a communication control device;
a second port for transmitting the digital reception signal to the communication control device;
a coding block configured to produce a reception signal inverse to the digital reception signal; and
a third port for transmitting the inverse reception signal to the communication control device.

12. The transmitting/receiving device according to claim 11, wherein the transmitting/receiving module is configured to transmit the transmission signal as a differential signal onto the bus, and wherein the third port is an input-to-output switchable port and is configured for signaling a standby state to the transmitting/receiving device, in which state no communication occurs on the bus.

13. The transmitting/receiving device according to claim 11, wherein a signal received in the first communication phase from the bus is produced with a different physical layer than a signal received in the second communication phase from the bus, and wherein, in the first communication phase, it is negotiated which of the subscriber stations of the bus system receives an at least temporarily exclusive, collision-free access to the bus in a subsequent second communication phase.

14. A bus system, comprising:
a bus; and
at least two subscriber stations which are connected to one another via the bus such that they can serially communicate with one another and of which at least one of the subscriber stations includes:
a transmitting/receiving device; and
a communication control device including:
a communication control module configured to produce a transmission signal for controlling a communication of the subscriber station with at least one other subscriber station of the bus system; and
an interface module, including:
at least one configuration register; and
a modulator configured to receive input of the transmission signal and to modulate the transmission signal to form a modulated transmission signal, which has a bit time of a second communication phase of a frame with which messages are exchanged between the subscriber stations of the bus system, the bit time being configured in the at least one configuration register and differing from a bit time of the first communication phase of the frame;
wherein the interface module is configured to:
output the transmission signal, input into the modulator, to a transmitting/receiving device of the subscriber station, in the first communication phase, in order to transmit the transmission signal onto a bus of the bus system; and output the modulated transmission signal produced by the modulator to the transmitting/receiving device of the subscriber station, in the second communication phase, to transmit the modulated transmission signal onto the bus of the bus system;

wherein the communication control module is configured to produce a control signal and to output the control signal to the interface module, the control signal indicating when the modulated transmission signal produced by the modulator is to be output to the transmitting/receiving device of the subscriber station; and wherein the transmitting/receiving device includes:
- a transmitting/receiving module configured to transmit the transmission signal onto a bus of the bus system, in which bus system at least the first communication phase and the second communication phase are used in order to exchange messages between subscriber stations of the bus system, and to produce a digital reception signal from a signal received from the bus;
- a first port for receiving the transmission signal from the communication control device;
- a second port for transmitting the digital reception signal to the communication control device;
- a coding block configured to produce a reception signal inverse to the digital reception signal; and
- a third port for transmitting the inverse reception signal to the communication control device.

15. A method for communication in a serial bus system in which at least one first communication phase and a second communication phase are used in order to exchange messages between subscriber stations of the bus system, the method being carried out by one of the subscriber stations using an interface module, the interface module including (a) at least one configuration register for configuring at least a bit time of the second communication phase of a frame using which messages are exchanged between subscriber stations of the bus system, and (b) a modulator, the method comprising the following steps:

modulating, using the modulator, a transmission signal to form a modulated transmission signal with the bit time of the second communication phase configured in the at least one configuration register that is different than a bit time of the first communication phase;

outputting, with the interface module in the first communication phase, the transmission signal input into the modulator to a transmitting/receiving device of the subscriber station in order to transmit the transmission signal onto the bus of the bus system; and outputting, using the interface module in the second communication phase, the modulated transmission signal produced by the modulator to the transmitting/receiving device of the subscriber station in order to transmit the modulated transmission signal onto the bus of the bus system.

\* \* \* \* \*